United States Patent [19]

Miller

[11] Patent Number: 4,666,950
[45] Date of Patent: May 19, 1987

[54] OXIDATION STABILIZATION OF THERMOPLASTIC FOAMS

[75] Inventor: Robert H. Miller, Newark, Ohio

[73] Assignee: The Dow Chemical Company, Midland, Mich.

[21] Appl. No.: 843,421

[22] Filed: May 21, 1986

[51] Int. Cl.$^4$ .............................................. C08J 9/14
[52] U.S. Cl. .................................... 521/134; 521/79; 521/81; 521/143
[58] Field of Search .................. 521/79, 81, 134, 98

[56] References Cited

U.S. PATENT DOCUMENTS

| | | | |
|---|---|---|---|
| 4,342,848 | 8/1982 | Blanchard et al. | 524/275 |
| 4,387,169 | 6/1983 | Zabrocki et al. | 521/79 |
| 4,395,510 | 7/1983 | Park | 521/79 |
| 4,415,707 | 11/1983 | Blanchard et al. | 524/275 |
| 4,421,866 | 12/1983 | Suh et al. | 521/79 |
| 4,569,950 | 2/1986 | Hoshi et al. | 521/79 |
| 4,581,383 | 4/1986 | Park | 521/79 |
| 4,591,606 | 5/1986 | Bergstrom | 521/79 |

Primary Examiner—Morton Foelak
Attorney, Agent, or Firm—Douglas N. Deline

[57] ABSTRACT

Thermoplastic resinous foams having improved resistance to oxidation are provided by the incorporation into such foams of a polyvinyl ether of a C$_{6-30}$ alcohol.

3 Claims, 1 Drawing Figure

OXIDATION STABILIZATION OF THERMOPLASTIC FOAMS

BACKGROUND OF THE INVENTION

The present invention relates to thermoplastic foams having improved stability to oxidation degradation. More particularly, the present invention relates to an improved stabilizer especially suited for use in extruded polyolefin foams.

It is previously known in the art to prepare thermoplastic objects having reduced densities by generating a cellular structure in such thermoplastic object. Such objects are referred to generically as foams. Foamed articles of substantial size and volume or extremely small size and volume are employed in numerous commercial applications such as cushioning and packaging materials. Foamed articles may consist of an open or closed cell structure. Such terms refer to the percentage of cells in the foam having direct communication with the outer surface of the object. They may be formed from any suitable thermoplastic polymer. Physical properties such as stiffness, density, dimensional stability, fabricability, etc. vary depending on the thermoplastic polymer employed to prepare the foam. Foams for use according to the present invention may be prepared by any suitable technique. A preferred process involves melting the resin; incorporating into the polymer melt a chemical agent, i.e. a blowing agent, to generate the desired cell structure; and thereafter foaming the thermoplastic resin. Foams having improved stiffness may be prepared by forming crosslinkages within the resin usually prior to or concurrently with the foaming process. Over time, the blowing agent generally escapes from the cells and is replaced by air.

A particular class of thermoplastic foams of generally low density for use mainly in nonstructural applications comprise polyolefin foams. These foams find substantial utility in the preparation of cushioned packaging and may be modified for different applications by the use of various polyolefins having differing physical properties such as density, tensile strength, tensile elongation, flexural modulus, etc.

Preferred polyolefin foams for use according to the present invention are foams of ethylenic polymers including high, low and medium density homopolymers of ethylene as well as copolymers of ethylene and copolymerizable ethylenically unsaturated comonomers. Such polyolefin foams are previously known in the art and described, for example, in U.S. Pat. Nos. 4,370,378; 3,505,249; 3,227,664; 3,102,865; 4,089,818; 3,808,300; 4,323,528; and other references.

Among the various performance standards required of a thermoplastic foam article, it is generally desirable that the foam not be deleteriously effected by atmospheric conditions over the useful life of the article. In particular, it is highly desirable that the deleterious effects of oxidation caused by the presence of atmospheric oxygen be eliminated or if not eliminated at least reduced to as low a level as possible. For example, in a cushioning application where it is desired to achieve repeated flexing of the foam structure, it is highly desirable that the cellular walls composed of extremely thin polymer films should not turn brittle or inelastic with age due to the effects of oxygen. In a foam, the large effective surface area exposed to available oxygen tends to accelerate the effect of oxidative degradation. As with any organic substance, oxidation may be found to be dependent upon environmental conditions. In particular, elevated temperatures and the presence of foreign substances which act as initiators or catalysts for oxidation processes may tend to exacerbate any deleterious effects due to the presence of oxygen. Accordingly, over long periods of time oxidation may result in decreased cushioning properties of a thermoplastic foam or structural failure of a thermoplastic foam due to excessive oxygen degradation of the cellular walls.

It is well known in the art, that the presence of certain compositions in the thermoplastic melt employed to make a foam can enhance the lubricating properties of the thermoplastic melt thereby resulting in reduced power consumption in extruding or processing of such polymer melts as well as reduced accumulations of polymer upon the die face during the preparation of extruded foamed articles. For example, a class of commonly employed lubricity additives are the stearates especially zinc stearate and calcium stearate. Disadvantageously, however, it has now been discovered that these metallic additives, particularly zinc stearate, deleteriously effect oxidation properties of the resulting foam structure. In particular, it has been found that a suitable measure of oxidation activity known as oxygen induction time is greatly decreased by the presence of zinc stearate or calcium stearate in a polyolefin foam structure. The reduction in measured oxygen induction time indicates the possibility of increased oxidative degradation of the polymer foam. Accordingly, it would be desirable to provide an improved thermoplastic foam having an enhanced ability to resist the effects of oxidation as indicated by a reduction in oxygen induction time.

In U.S. Pat. Nos. 4,415,707 and 4,342,848, there is disclosed the use of a processing modifier comprising polyvinyloctadecyl ether in a polyolefin resin such as polyethylene. The incorporation of this processing modifier resulted in the beneficial effects of improved surface properties in extruded articles, improved tensile strength and other physical properties of the resulting extruded polymer, and improved melt lubricity. Foamed articles were not prepared nor were oxygen induction studies performed on fabricated articles.

SUMMARY OF THE INVENTION

According to the present invention, there is now provided an improved thermoplastic resin foam comprising 100 parts by weight of a thermoplastic resin and from about 0.01 to about 1.0 parts by weight of a polyvinyl ether of a $C_{6-30}$ alcohol. In addition, according to the present invention there is provided a process for preparing the above described improved thermoplastic foam comprising the steps of: (a) heating to a temperature above its melting point a mixture comprising about 100 parts by weight of a thermoplastic resin and from about 0.01 to about 1.0 parts by weight of a polyvinyl ether of a $C_{6-30}$ alcohol, and (b) foaming the resulting mixture.

DETAILED DESCRIPTION OF THE INVENTION

Figure 1:
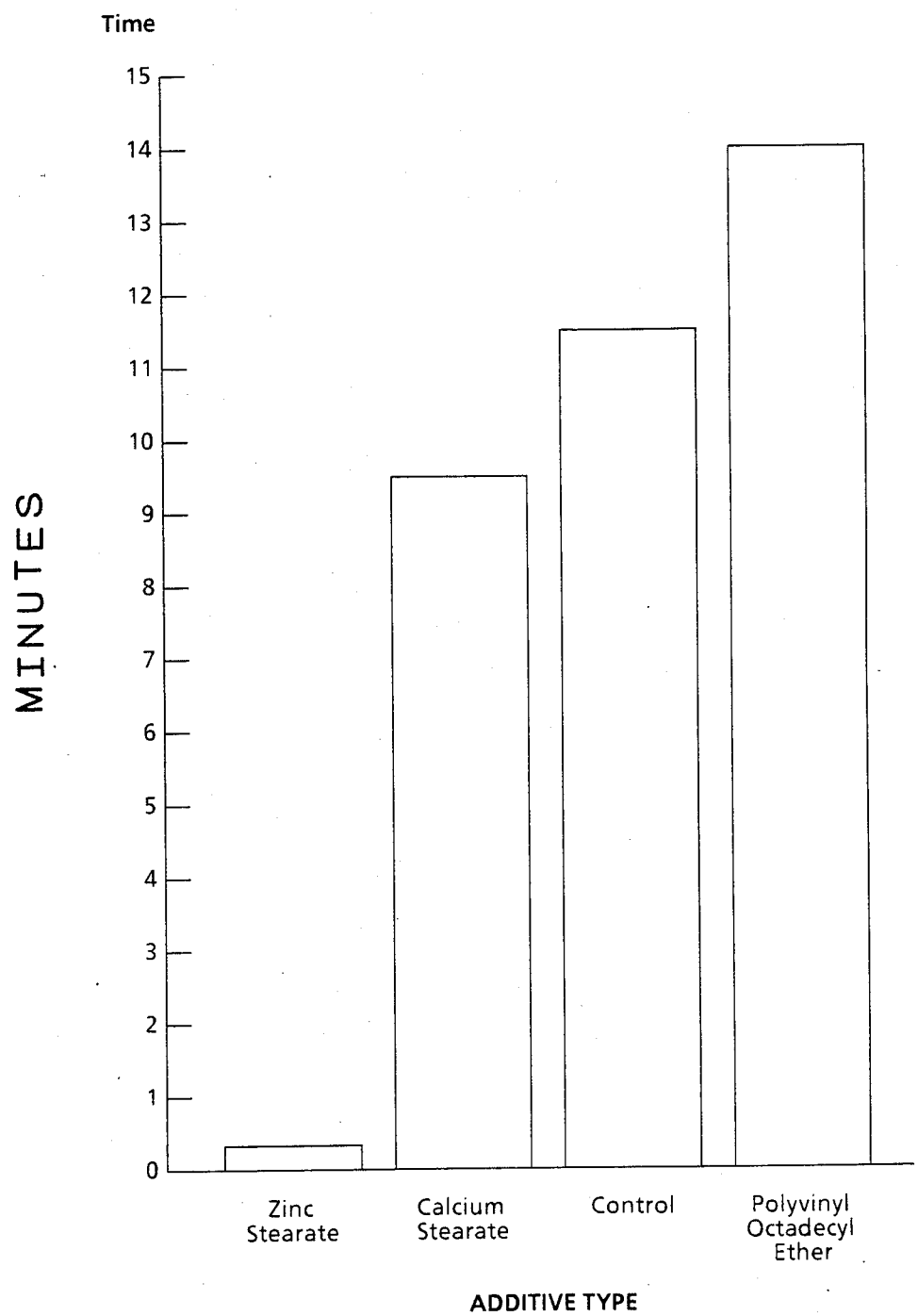
FIG. 1 is a graph showing oxygen induction times of various polymer samples measured according to Example 3.

Polyvinyl ethers of $C_{6-30}$ alcohols usefully employed as additives in the foams of the present invention are characterized as containing a repeating unit corresponding to the formula

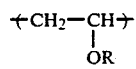

wherein R is a $C_{6-30}$ alkyl or cycloalkyl group. These polymers are readily available commercially or may be prepared according to well known techniques. Suitable methods include the polymerization of a monomer prepared by reaction of the sodium derivative of a $C_{6-30}$ alcohol with a vinyl halide. Included are homopolymers and copolymers of the above monomeric ethers with one or more copolymerizable comonomers. Preferred polymers are homopolymers of the polyvinyl ether. A particularly suitable polymer comprises polyvinyloctadecyl ether available under the trade designation Wax V available from American Hoechst Corporation, Mountain Side, N.J.

Preferably the polyvinyl ethers used in the present invention have a number average molecular weight of between about 1,000 and about 10,000 and more preferably about 3,000 and about 5,000.

The polyvinyl ether is conveniently incorporated into the thermoplastic resin prior to foaming by any suitable technique. Preferably, the thermoplastic resin is melted by use of a blender, rollmill, extruder or other suitable technique, and the polyvinyl ether is incorporated by mechanically blending. Additional additives particularly useful in the foaming process may be added either concurrently, following, or preceding addition of the polyvinyl ether. Suitably such additional additives include blowing agents (either solid, liquid or gaseous), nucleators, dyes, pigments, additional lubricating additives, crosslinking agents, and other standard additives. Preferred blowing agents are volatile organic compounds employed either singly or in admixture. Especially preferred blowing agents are the well known fluorocarbons and fluorochlorocarbons. Foaming is thereafter generally occasioned by releasing the molten extrudate into a zone of reduced pressure. Crosslinked foams may readily be prepared by radiation or chemical means. Foams according to the invention may be further treated according to well known techniques to foam laminated structures, fabricated articles, etc.

While the thermoplastic resin suitably employed in the preparation of the foams according to the present invention is not critical to the success of the invention, it is preferred to employ polyolefin resins and particularly polyethylene of low, medium or high density. A particularly preferred polyethylene resin comprises low density polyethylene having a density from about 0.90 to about 0.93 g/cc.

The present invention will now be further illustrated by means of the following examples, which are not to be interpreted in any sense as limiting the scope of the present invention. Where provided percentages, parts and ratios are measured by weight.

EXAMPLE 1

Foamed polyethylene is prepared by melt blending low density polyethylene (PE 620 available from The Dow Chemical Company) in an extruder operating at 110 rpm equiped with a separate pin mixer operating at 21 rpm. The polyethylene is added at a rate of 300 pounds per hour. Talc nucleating agent at a rate of 1.5 pounds per hour and a blowing agent mixture comprising an 80/20 ratio mixture of 1,2-dichloro-1,1,2,-2-tetrafluoroethane (Freon ® 114) and dichlorodifluoromethane (Freon ® 12) at a rate of about 60 pounds per hour are added. Polyvinyloctadecyl ether (Wax V, available from American Hoechst Corporation) is also added so as to provide a concentration of 0.1 percent in the resulting foam.

The extrudate is discharged at a temperature of about 160° C., cooled to about 110° C., passed through a die of generally circular cross-section, and allowed to expand. Only a small amount of polymer build up occurred on the die face and the resulting foam having a density of about 2.2 lb/ft$^3$ was white in color and dimensionally stable.

EXAMPLE 2

Repeating the procedure of Example 1 with the exception that the amount of polyvinyloctadecyl ether is increased to 0.5 percent results in virtually no polymer residue on the die face and preparation of a dimensionally stable white foam.

EXAMPLE 3

The oxygen induction times of three low density polyethylene samples (PE 620 available from The Dow Chemical Company) containing 3 percent each of polyvinyloctadecyl ether, calcium stearate and zinc stearate as well as a control containing no additives are measured by differential scanning calorimetry. In the procedure, each sample is heated to 190° C. in air and retained under isothermal conditions. The onset of an exotherm which indicates the onset of an oxidation reaction between the sample and air is recorded as the oxygen induction time. The averages of the three measurements are: 0.4 minutes for the samples containing zinc stearate, 9.5 minutes for the samples containing calcium stearate, 11.5 minutes for the samples control and approximately 14 minutes for the samples containing polyvinyloctadecyl ether. This data, which is also reproduced in FIG. 1, clearly demonstrates the improved resistance to oxidation as indicated by appreciably longer oxygen induction times for the polymer according to the present invention compared to similar polymers containing zinc or calcium stearate additives or a control.

What is claimed is:

1. A process for preparing a polyolefin thermoplastic foam comprising the steps of, (a) heating to a temperature above its melting point a mixture comprising 100 parts by weight of a polyolefin thermoplastic resin, a blowing agent, and from about 0.01 to about 1.0 parts by weight of a polyvinyl ether of a $C_{6-30}$ alcohol; and (b) foaming the resulting mixture.

2. A process according to claim 6, wherein the blowing agent comprises a volatile organic compound.

3. A process according to claim 1, wherein the polyvinyl ether of a $C_{6-30}$ alcohol is polyvinyloctadecyl ether.

* * * * *

UNITED STATES PATENT AND TRADEMARK OFFICE
CERTIFICATE OF CORRECTION

PATENT NO. : 4,666,950

DATED : May 19, 1987

INVENTOR(S) : Robert H. Miller

It is certified that error appears in the above-identified patent and that said Letters Patent is hereby corrected as shown below:

Col. 3, line 54, "foam" should read --form--.

Col. 4, line 63, "6" should read --1--.

Signed and Sealed this

Nineteenth Day of April, 1988

Attest:

DONALD J. QUIGG

*Attesting Officer*   *Commissioner of Patents and Trademarks*